US011620122B2

(12) United States Patent
Tinker et al.

(10) Patent No.: US 11,620,122 B2
(45) Date of Patent: Apr. 4, 2023

(54) AUTOMATION CONTROLLER FOR UPGRADING AN IT INFRASTRUCTURE

(71) Applicant: Verinext Corp., Blue Bell, PA (US)

(72) Inventors: Gregory L. Tinker, Milton, GA (US); George Carter, Centre, AL (US)

(73) Assignee: Verinex Corp., Blue Bell, PA (US)

( * ) Notice: Subject to any disclaimer, the term of this patent is extended or adjusted under 35 U.S.C. 154(b) by 0 days.

(21) Appl. No.: 17/249,188

(22) Filed: Feb. 23, 2021

(65) Prior Publication Data

US 2021/0271467 A1    Sep. 2, 2021

Related U.S. Application Data

(60) Provisional application No. 62/982,923, filed on Feb. 28, 2020.

(51) Int. Cl.
*G06F 8/65* (2018.01)
*G06F 11/32* (2006.01)
(Continued)

(52) U.S. Cl.
CPC ............ *G06F 8/65* (2013.01); *G06F 9/45558* (2013.01); *G06F 9/547* (2013.01); *G06F 11/327* (2013.01);
(Continued)

(58) Field of Classification Search
CPC ............. G06F 8/60–66; G06F 11/1433; G06F 11/327; G06F 9/45558; G06F 9/547; G06F 2009/45591; G06F 2201/815
(Continued)

(56) References Cited

U.S. PATENT DOCUMENTS

2002/0120723 A1* 8/2002 Forth ............... H04L 9/40
709/221
2012/0198438 A1* 8/2012 Auer ............... G06F 8/61
717/176
(Continued)

FOREIGN PATENT DOCUMENTS

WO    WO-0127788 A1 *  4/2001  ......... H04L 12/2805
WO    WO-2015136621 A1 *  9/2015  ............ G06F 8/65

OTHER PUBLICATIONS

Ayachitula, Naya, et al., IT service management automation, IEEE International Conference on Services Computing, Jul. 2007, 8 pages, [retrieved on Nov. 15, 2022], Retrieved from the Internet: <URL:http://ieeexplore.ieee.org/>.*
(Continued)

*Primary Examiner* — Geoffrey R St Leger
(74) *Attorney, Agent, or Firm* — Trenner Law Firm, LLC; Mark Trenner (57) ABSTRACT

An automation controller is disclosed which provides central management of an upgrade process in an IT infrastructure. An example automation controller includes a control module configured to execute an automation code script and a corresponding automation input file. An index module is configured to index data from the automation input file to identify at least one target node in the IT infrastructure to be upgraded. The index module is further configured to associate a patch firmware bundle with the target node. An execution module is configured to execute the automation code script. A management module is configured to manage the upgrade process through to exception or successful completion of the upgrade process at the target node.

25 Claims, 9 Drawing Sheets

(51) Int. Cl.
  *G06F 9/455*   (2018.01)
  *G06F 9/54*    (2006.01)
  *G06F 11/14*   (2006.01)

(52) U.S. Cl.
  CPC .............. *G06F 11/1433* (2013.01); *G06F 2009/45591* (2013.01); *G06F 2201/815* (2013.01)

(58) Field of Classification Search
  USPC .................................. 717/168–178
  See application file for complete search history.

(56) References Cited

U.S. PATENT DOCUMENTS

| | | | |
|---|---|---|---|
| 2013/0275975 A1* | 10/2013 | Masuda | G06F 9/45558 718/1 |
| 2015/0295788 A1* | 10/2015 | Witzman | H04L 41/5006 709/224 |
| 2016/0203067 A1* | 7/2016 | Marko | G06F 11/2268 714/37 |
| 2018/0217828 A1* | 8/2018 | Madrid | H04W 12/106 |
| 2019/0243631 A1* | 8/2019 | Sharma | G06F 21/572 |
| 2020/0097580 A1* | 3/2020 | Nayak | G06F 16/907 |

OTHER PUBLICATIONS

Herrick, Dan R., et al., Sustainable Automated Software Deployment Practices, SIGUCCS '13: Proceedings of the 41st annual ACM SIGUCCS conference on User services, Nov. 2013, 8 pages, [retrieved on Nov. 15, 2022], Retrieved from the Internet: <URL:http://dl.acm.org/>.*

* cited by examiner

AUTOMATION CONTROLLER FOR UPGRADING AN IT INFRASTRUCTURE

PRIORITY CLAIM

This application claims the priority filing benefit of U.S. Provisional Patent Application No. 62/982,923 filed Feb. 28, 2020 for "Automation Controller For Upgrading An IT Infrastructure" of Gregory L. Tinker and George Carter, hereby incorporated by reference in its entirety as though fully set forth herein.

BACKGROUND

Upgrading firmware and patching of large-scale IT infrastructure is a big undertaking and can be extremely labor intensive. Indeed, system administrators often have to organize upgrade teams of ten or more engineers just to focus on a singular element of the overall upgrade project. These teams may even be divided up by skill set and/or expertise to work on a particular set of elements within the scope of the project. These sub-teams often have to work on their assigned elements sequentially if the upgrade paths are codependent on the previous task. This can end up causing the project to take longer to complete. It is common for these types of upgrade projects to take months or even years, including resolving compatibility and post-upgrade troubleshooting. The upgrade process can be further exacerbated by the unavailability of critical infrastructure while undergoing the upgrade.

Even small to mid-sizes IT infrastructure environments may be subject to some of the same or similar challenges. While these smaller environments may not require large upgrade teams, upgrading infrastructure with a small administration team can still result in lengthy upgrade windows. And the environment may still be impacted by the unavailability of critical infrastructure during the upgrade.

DETAILED DESCRIPTION

An automation controller is disclosed as it may be implemented to automate the upgrade process (e.g., firmware, patches, and/or drives) for an Information Technology (IT) infrastructure. The automation controller may be implemented in a large-scale or other size IT infrastructure.

In an example, the automation controller provides central management of an upgrade process in an IT infrastructure. An automation controller may be provided for housing and managing automation code script and the automation input file(s). When the automation code script is initiated, the automation controller indexes the necessary data from the input file(s) in order to determine the target node(s) and their associated patch/firmware bundles. The automation controller manages the upgrade process through to exception and/or successful completion.

In an example, a single interface of the automation controller is utilized to execute upgrades of both virtual and physical environments. The upgrades can target a single specific target node or an entire cluster/enclosure. Additionally, the upgrade execution can be configured to run in parallel, thereby upgrading the virtual layer first and then the underlying physical layer. This automation of the entire upgrade process, rather singular or in parallel, significantly reduces the overall upgrade time and reduces or altogether eliminates human error. Furthermore, the entire process can be managed and executed by a single administrator/user versus an entire upgrade team.

Before continuing, it is noted that as used herein, the terms "includes" and "including" mean, but is not limited to, "includes" or "including" and "includes at least" or "including at least." The term "based on" means "based on" and "based at least in part on".

Also as used herein, the term "automation controller" means, but is not limited to, a server (e.g., LINUX™, hardware agnostic) installed with automation script-based software. The automation script resides and is executed from this platform and targets other entities for agentless upgrades.

The term "hypervisor" means, but is not limited to, computer software, firmware, and/or hardware that creates and executes virtual machine(s).

The term "virtual machine" means, but is not limited to, an emulation of a computer system and is based on computer architectures. A virtual machine provides the functionality of a physical computer.

The term "physical server" means, but is not limited to, a single-tenant compute server which includes memory, processor, network, hard drive, and an operating system (OS).

The term "patch management server" means, but is not limited to, a server or web endpoint utilized to orchestrate and manage patch/firmware deployments to targeted server(s).

The term "patch bundles/templates" means, but is not limited to, a collection of patches grouped together to streamline deployment for one or more server family.

It is also noted that the examples described herein are provided for purposes of illustration, and are not intended to be limiting. Other devices and/or device configurations may be utilized to carry out the operations described herein.

Figure 1:
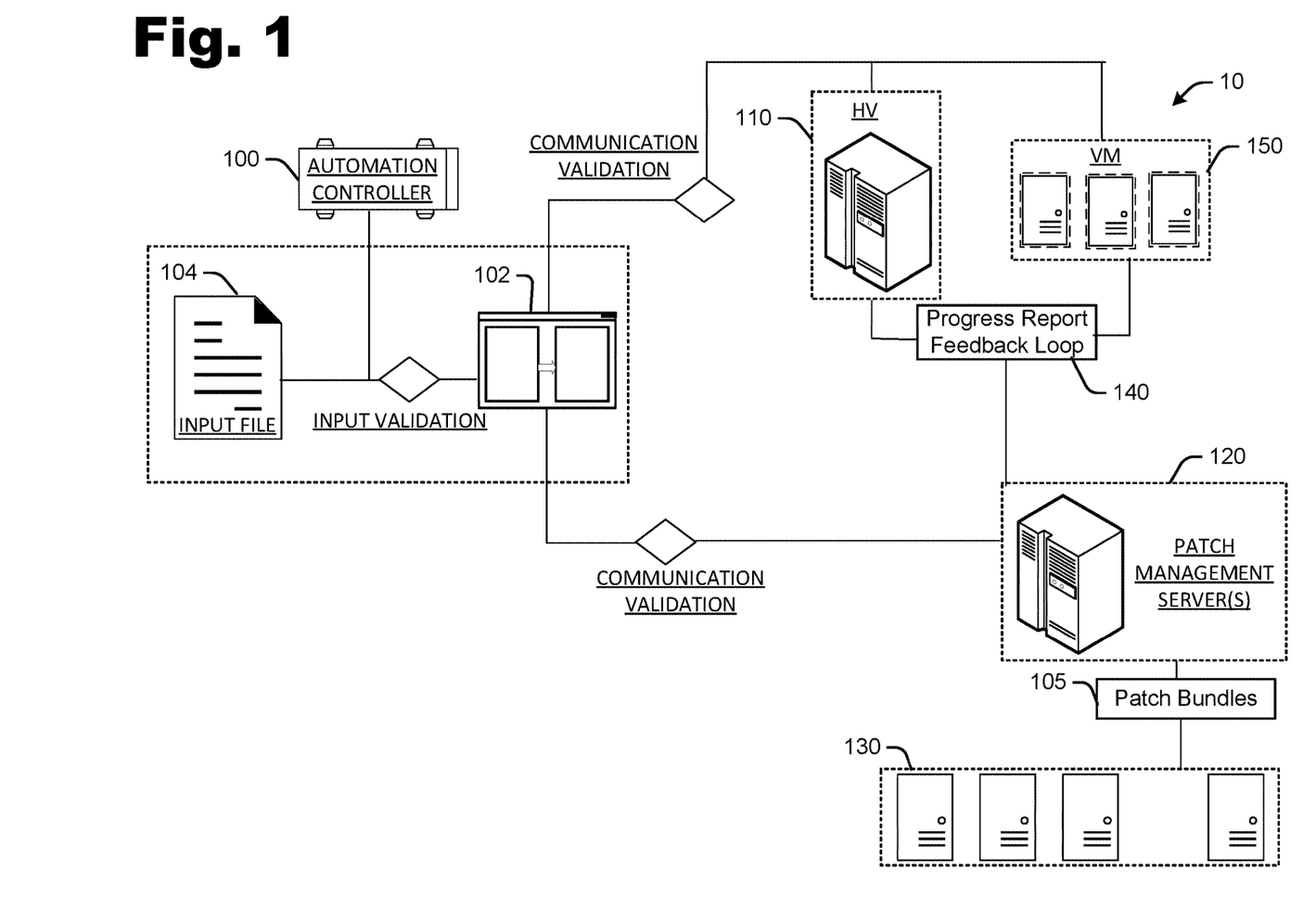
FIG. 1 is a high-level block diagram of an example networked computer system or IT infrastructure in which an automation controller may be implemented to upgrade an IT infrastructure.

FIG. 1 is a high-level block diagram of an example networked computer system or IT infrastructure 10 in which an automation controller 100 may be implemented to upgrade the IT infrastructure 10. The automation controller 100 may be implemented with any of a wide variety of computing environments. The automation controller 100 itself may be implemented in hardware as any of a wide variety of computing devices, such as, but not limited to, stand-alone computers, workstations, server computers, blade servers, mobile devices, and appliances (e.g., devices dedicated to providing a service), to name only a few examples.

Each of the computing devices may include memory, storage, and a degree of data processing capability at least sufficient to manage a communications connection either directly with one another or indirectly (e.g., via a network).

At least one of the computing devices is also configured with sufficient processing capability to execute the program code described herein.

For purposes of illustration, the automation controller 100 may include a processing service executing on a host configured as a server computer with computer-readable storage. In an example, the automation controller 100 provides an upgrade service and can be accessed by an administrator/user (e.g., directly or via a separate client device).

Example services of the automation controller 100 may include, but are not limited to, general purpose computing services (e.g., access upgrade files and other sources of data sets hosted on the Internet or as dynamic data endpoints for any number of client devices). Services also include interfaces to application programming interfaces (APIs) and related support infrastructure, such as application engines (e.g., infrastructure maps), and hosted services, etc. Although, it is noted that the operations described herein may be executed by program code residing on or accessible by automation controller, more than one physical device may be provided.

The IT infrastructure 10 with which the automation controller 100 is implemented may also include a communication network, such as a local area network (LAN) and/or wide area network (WAN). In one example, the network includes the Internet or other mobile communications network (e.g., a 3G, 4G or 5G mobile device network). Network may also provide greater accessibility for the upgrade service, e.g., for use in distributed environments.

The automation controller 100 may be provided on the network via a communication connection, such as via an Internet service provider (ISP). In this regard, the administrator/user is able to access the automation controller directly or indirectly via the network, or via an agent, such as another network.

In an example, the program code has access to both the automation controller 100 and the IT infrastructure 10 via the networked computer system. For example, the automation controller 100 may operate as a cloud-based service, wherein the program code is executed on at least one computing device local to the IT infrastructure 10, but having access to the upgrade service in a cloud-based computing system.

Before continuing, it is noted that the computing devices are not limited in function. The computing devices may also provide other services in the IT infrastructure 10. For example, the automation controller 100 may also provide transaction processing services and issue alerts via various services for the administrator/user.

The automation controller 100 may be implemented as a central initiation point for the upgrade automation process. The automation controller 100 houses and manages the automation code script 102 and the automation input file(s) 104. When the automation code script 102 is initiated, the automation controller 100 indexes the necessary data from the input file(s) 104 in order to determine the target node(s) and their associated patch/firmware bundles 105.

As mentioned above, the automation controller 100 may be executed by program code executing on any suitable computing device and may serve one or more than one IT infrastructure.

The location of the patch/firmware bundles 105 may also be specified if not inherited from a hypervisor 110 or patch management servers 120. After indexing the input file 104, the automation code script 102 performs a connectivity test on all target nodes 130 to ensure communication. If the input file 104 is missing data and/or improperly formatted, the automation code script 102 may halt and issue notifications to the administrator/user (e.g., via console and email alerts). Likewise, if communication cannot be established to one or more target nodes 130, the automation code script 102 can halt and send notifications to the administrator/user (e.g., via console and email).

In an example, communication between the automation controller 100 and nodes in the IT infrastructure (e.g., end-point physical servers or target nodes 130, or even the hypervisors 110 and/or patch management servers 120) utilizes a secure shell protocol (e.g., SSH). Secure Shell is a cryptographic network protocol for operating network services securely over an unsecured network. Other secure communications may also be implemented.

In an example, target node inventory is performed after confirmation of communication between the automation controller 100 and the target nodes 130. In addition to node inventory, validations may be performed against the target node 130 based on variables from the input file 104. These validations may include patch level, hardware revision level, CPU/memory saturation thresholds, VSAN thresholds (where applicable), and overall system health. These validations may be performed to ensure that the target node 130 has sufficient health and resources for the pending upgrade procedure.

After the validations are complete, the automation controller 100 marks the target node 130 for maintenance within the configuration management database (CMDB), and places the target node 130 into a maintenance posture giving attention to any HA migration flags. From this posture, the automation controller 100 can utilize the hypervisor 110 to execute the specified updates from the input file.

During the upgrade process status messages are continuously sent to the automation controller via a progress report feedback loop 140 and subsequently recorded (e.g., in an automation controller log file). If any errors are encountered, the automation controller 100 can halt the upgrade and issue an alert to the administer (e.g., as specified in the input file).

Upon successful completion of the upgrade process, the automation controller 100 verifies the patch/hardware revision levels and moves the target node(s) 130 out of the maintenance posture, resetting the HA migration flags where applicable. Once completed, the target node(s) 130 status is updated within the CMDB and a final confirmation may be issued to the administrator/user.

In another example, the administrator/user can elect to keep the server in a maintenance posture, and then enable the automation controller 100 to upgrade the underlying infrastructure before exiting the maintenance posture.

In addition to virtual infrastructure upgrade capability, the automation controller 100 can also upgrade the underlying hardware infrastructure servers as the foundation layer for a virtual environment 150. To accomplish this task, the automation controller 100 communicates securely (SSH) to the patch/firmware management server 120 for the environment and begins patch, firmware, and system health validation.

In an example, the automation controller 100 may execute a REST API if the patch management server 120 has sufficient capabilities to support this functionality. If any validations fail, the automation controller 100 may halt the upgrade process and issue an alert to the administrator/user (e.g., as specified in the input file).

Upon successful validation of the target node(s) 130, the automation controller 100 may implement the patch management server 120 to push the patch/firmware baselines to the specified target node(s) 130. During the upgrade process, status messages may be continuously issued to the automation controller 100 and subsequently recorded in the automation controller log file. If any errors are encountered, the automation controller 100 may halt the upgrade and issue alerts to the administrator/user (e.g., specified in the input file).

In an example, after successful completion of the upgrade process, the automation controller verifies the patch/hardware revision levels and moves the target node(s) 130 out of the maintenance posture. The automation controller 100 may reset the HA migration flags, where applicable, update the CMDB, and issue a successful completion alert to the administrator/user.

Figure 2:
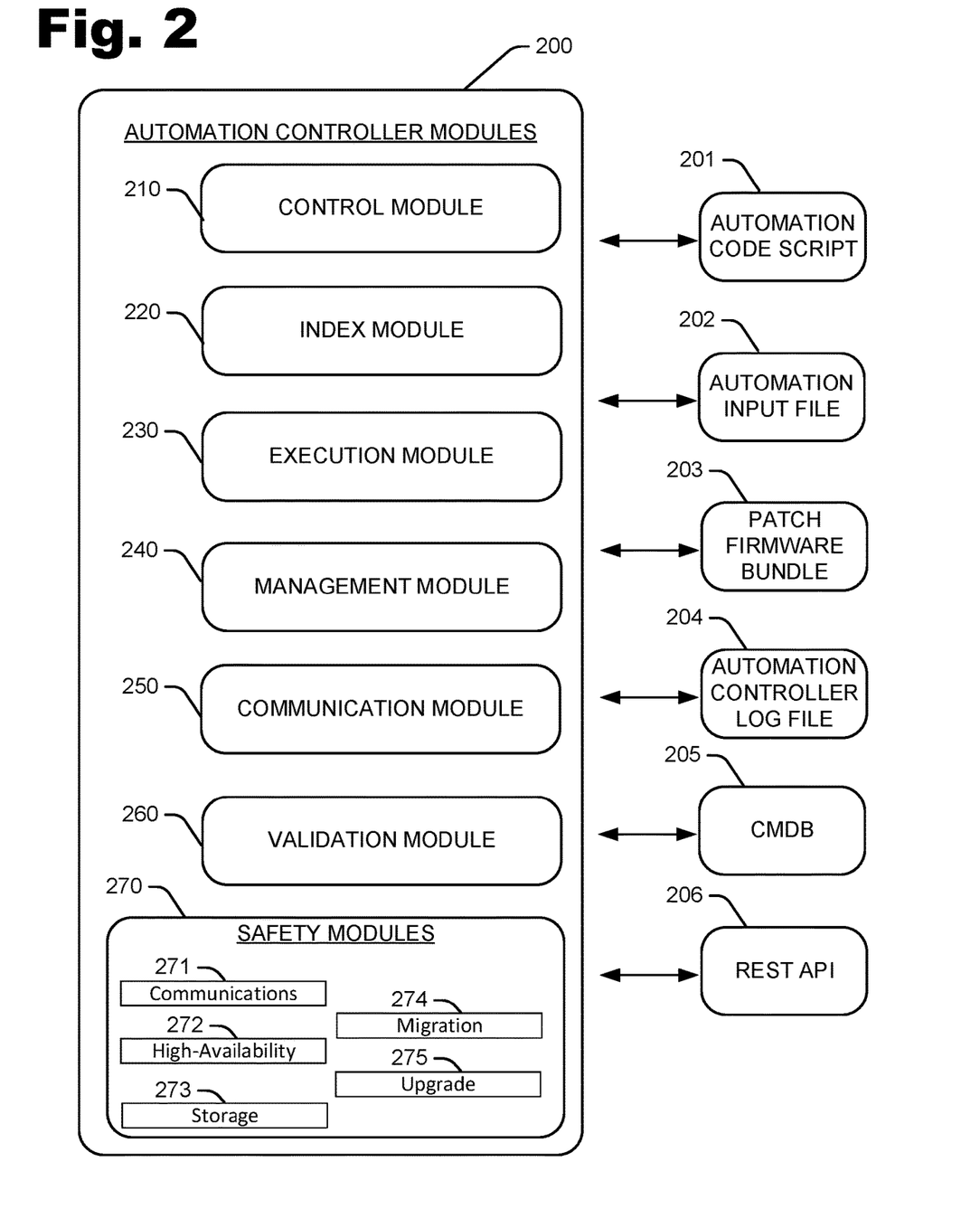
FIG. 2 shows example modules executed by the automation controller to provide central management of an upgrade process in an IT infrastructure.

FIG. 2 shows example modules 200 executed by the automation controller to provide central management of an upgrade process in an IT infrastructure. In an example, the modules 200 include a control module 210 configured to execute an automation code script 201 and at least one corresponding automation input file 202. The modules 200 may also include an index module 220 configured to index data from the automation input file 202 to identify at least one target node in the IT infrastructure to be upgraded. The index module 220 may be further configured to associate at least one patch firmware bundle 203 with the target node in the IT infrastructure. The modules 200 may also include an execution module 230 configured to execute the automation code script 201. The modules 200 may also include a management module 240 configured to manage the upgrade process through to exception or successful completion of the upgrade process at the target node in the IT infrastructure.

In an example, if the index module 220 determines that the automation input file 202 is missing data or the input file is improperly formatted, the execution module 230 halts executing the automation code script 201 and issues a notification to an administrator.

In an example, a communications module 250 is configured to receive a location of the patch firmware bundle 203 from a hypervisor. The communications module 250 is also configured to receive a location of the patch firmware bundle 203 from a patch management server.

In an example, the automation code script includes instructions to perform a connectivity test on the target node to ensure communication after the index module 220 indexes the automation input file 202. If the communications module 250 cannot establish communication to the target node, the execution module 230 halts executing the automation code script 201 and issues a notification to an administrator.

In an example, the index module 220 performs target node inventory after confirmation of communication between the automation controller and the target node.

In an example, a validation module 260 performs validation against the target node based on variables from the automation input file 202 to ensure that the target node meets minimum defined health parameters and has minimum defined resources available for a pending upgrade process. After completing validation, the target node is marked for maintenance within a configuration management database (CMDB), and the target node is placed into a maintenance posture giving attention to any migration flags so that a hypervisor is available to execute specified updates from the automation input file.

In an example, the management module 240 receives status messages during the upgrade process and subsequently recorded in an automation controller log file 204. The management module 240 may halt the upgrade process if any errors are encountered during the upgrade process, and the management module 240 issues an alert to an administrator specified in the automation input file 201.

In an example, the management module 240 verifies patch and hardware revision levels and moves the target node out of a maintenance posture by resetting hypervisor migration flags upon successful completion of the upgrade process.

In an example, the management module 240 updates a status of the target node within a configuration management database (CMDB) 205 and a final confirmation of the successful completion of the upgrade process is issued to the administrator. The management module 240 produces an option for the administrator to elect to retain the target node in a maintenance posture after the successful completion of the upgrade process and continue by upgrading underlying hardware infrastructure before exiting the maintenance posture. The management module 240 is further configured to upgrade the underlying hardware infrastructure as a foundation layer for a virtual environment by communicating to a management server for the virtual environment.

In an example, the management module 240 executes a REST API 260, and if any validations fail, the management module halts the upgrade process and issues an alert to an administrator specified in the automation input file.

In an example, the management module 240 instructs a patch management server to push patch and firmware baselines to the target node.

In an example, the management module 240 receives status messages during the upgrade process, and the management module 240 subsequently records the status messages in an automation controller log file 204. If any errors are encountered, the management module 240 halts the upgrade process and issues an alert to an administrator specified in the automation input file 202.

In an example, after successful completion of the upgrade process, the management module 240 verifies patch and hardware revision levels at the target node, moves the target node out of a maintenance posture, resets hypervisor migration flags where applicable, updates the configuration management database (CMDB) 205, and issues a successful completion alert to an administrator.

In an example, different safety logic modules 270 execute at predesignated times throughout the upgrade process. Example safety logic modules 270 may include, but are not limited to, safety logic modules 270 for communication, storage, high-availability, upgrade, and migration. The safety logic modules 270 ensure all elements necessary for successful upgrade completion are in place and functioning properly. Process faults and notifications are executed upon the failure of any one of the modules 200, which stops the overall process.

The communication safety logic 270 receives input data identifying the desired target with associated allowed communication protocols. The module 270 then executes communication functions to all targets and hosts, ensuring connectivity. Upon successful completion of the communication safety logic module 270, both storage and high-availability safety logic modules are called.

The high-availability safety logic module 272 validates that the target node(s) have redundancy in the network stack and are absent of any single points of failure. Additional checks are executed to ensure that the target hypervisor has high-availability settings enabled.

The storage safety logic module 273 ensures that any shared storage pool associated with the target node(s) can be safely removed without causing disruptions to applications dependent on the data source. Workload migration and process checks are also executed to ensure the absence of dependent processes.

The migration safety logic 274 ensures that all virtual machines associated with the target node(s) can safely migrate to another host without breaching pre-defined CPU and memory thresholds which could impact uptime response times. The module 274 also maintains stateful data, thereby tracking any migrated virtual machines to ensure that, upon upgrade completion, the virtual machines can be returned to their original hosts.

The upgrade safety logic 275 captures performance validation and rollback functionality. Upon completion of an upgrade element, the module 275 validates that the element is installed and properly functioning. In the event of a failure, the module 275 allows for one or more retry functions to execute the re-application of the element. If the retry function also results in failure, the module 275 notifies the service desk and executes a roll-back function to return the node to its previous state/condition.

The service desk functionality allows the process to easily interface with the client's service desk utilizing email and/or REST API communications as defined by the operator. This allows the process to execute independently without user intervention, while at the same time providing status updates at key junction points.

Example operations are shown and described with reference to the process flow diagrams of FIGS. 2-6 and FIGS. 7-8. These operations illustrate example implementations of an automation controller which may be implemented to upgrade an IT infrastructure. It is noted that the operations are not limited to the ordering shown. Still other operations may also be implemented.

FIGS. 3-7 are process flow diagrams illustrating an example of an operator supplying input data to execute an upgrade by validating the input data and supplying an upgrade blueprint to safety logic modules which ensure that standards are maintained throughout the upgrade.

Figure 3:
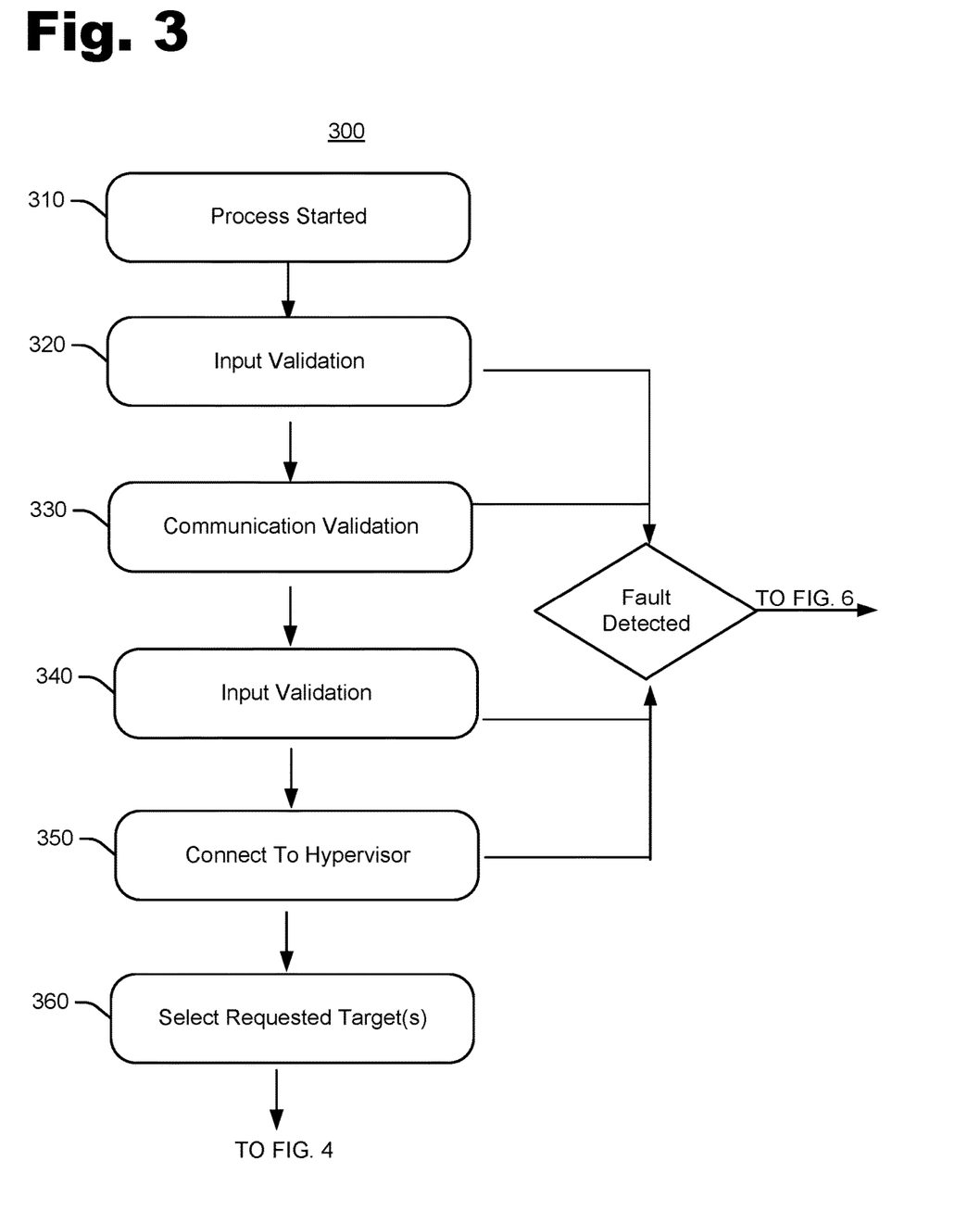
FIGS. 3-7 are process flow diagrams illustrating an example of an operator supplying input data to execute an upgrade by validating the input data and supplying an upgrade blueprint to safety logic modules which ensure that standards are maintained throughout the upgrade.

In FIG. 3, example operations 300 include starting the process at operation 310, and validations (input validation, communication validation, and input validation) at operations 320, 330, and 340. Operation 350 connects to a hypervisor. If a fault is detected during any of operations 320-350, operations may proceed to FIG. 6. Otherwise, requested target(s) are selected inoperation 360 and operations continue to FIG. 4.

Figure 4:
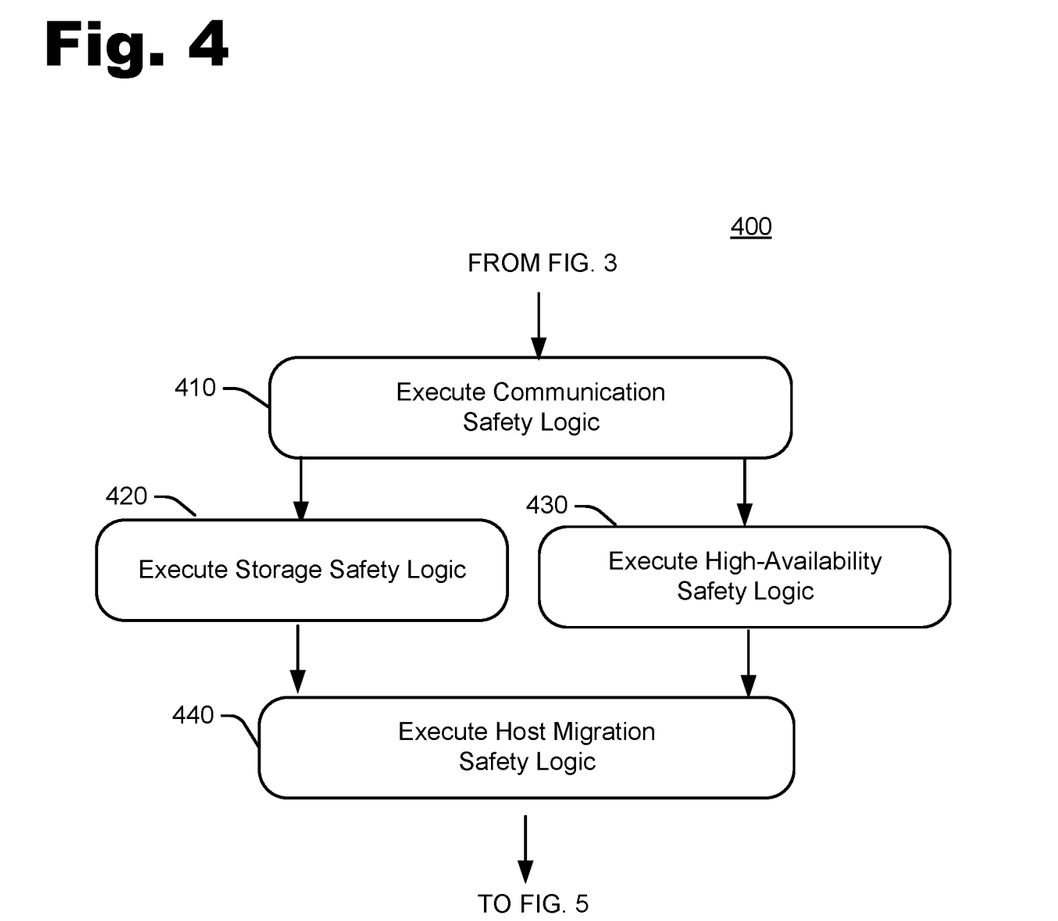

In FIG. 4, example operations 400 include executing communication safety logic in operation 410, executing storage safety logic in operation 420 and executing high-availability safety logic in operation 430. Host migration safety logic executes in operation 440, and then operations proceed to FIG. 5.

Figure 5:
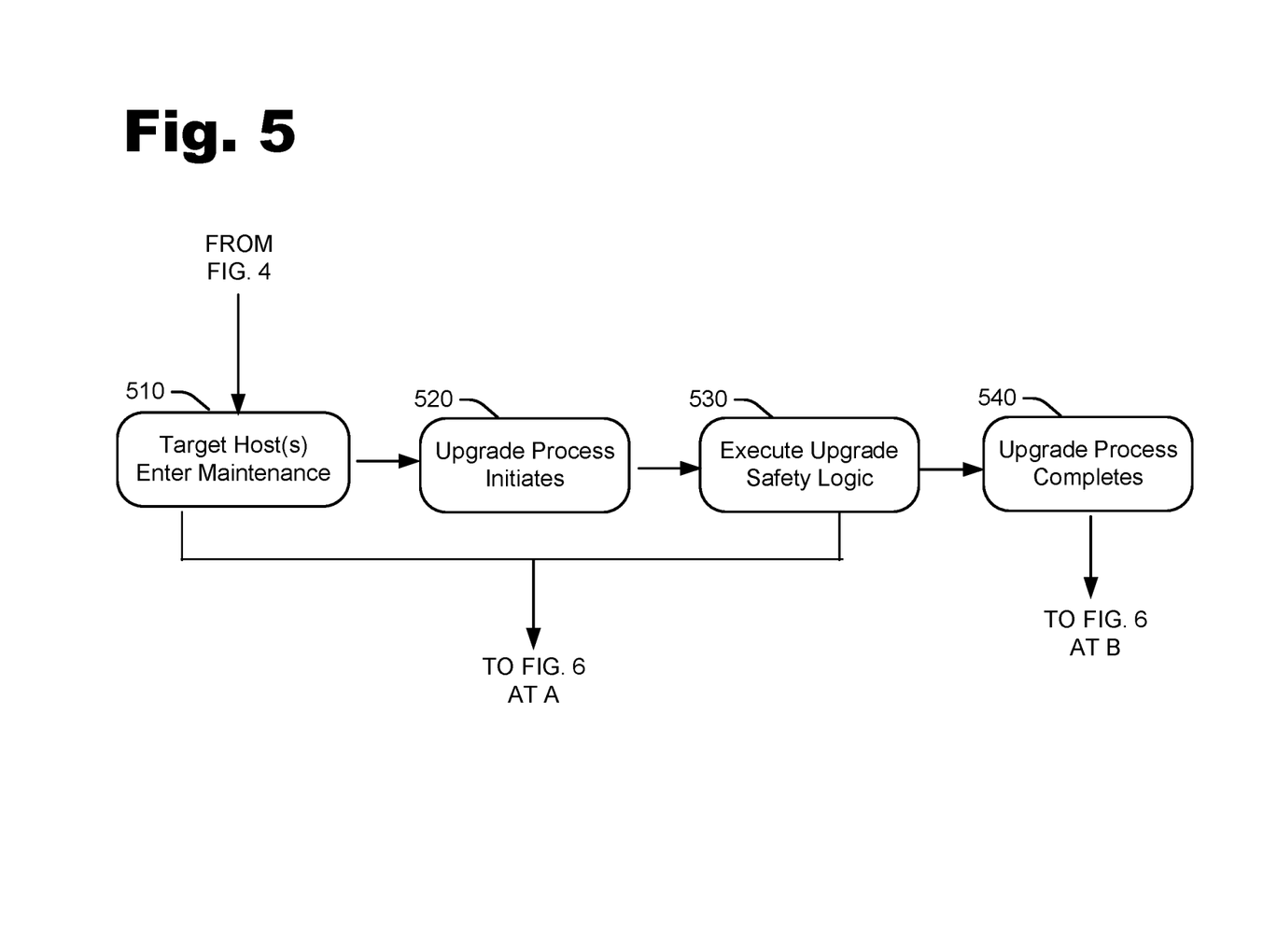

In FIG. 5, example operations 500 include target host(s) entering maintenance at operation 510, initiate upgrade process at operation 520, and execute upgrade safety logic at operation 530. Operations 510 and 530 trigger operations shown in FIG. 6 (entering at A). The upgrade process completes at operation 540, and proceeds to operations shown in FIG. 6 (entering at B).

Figure 6:
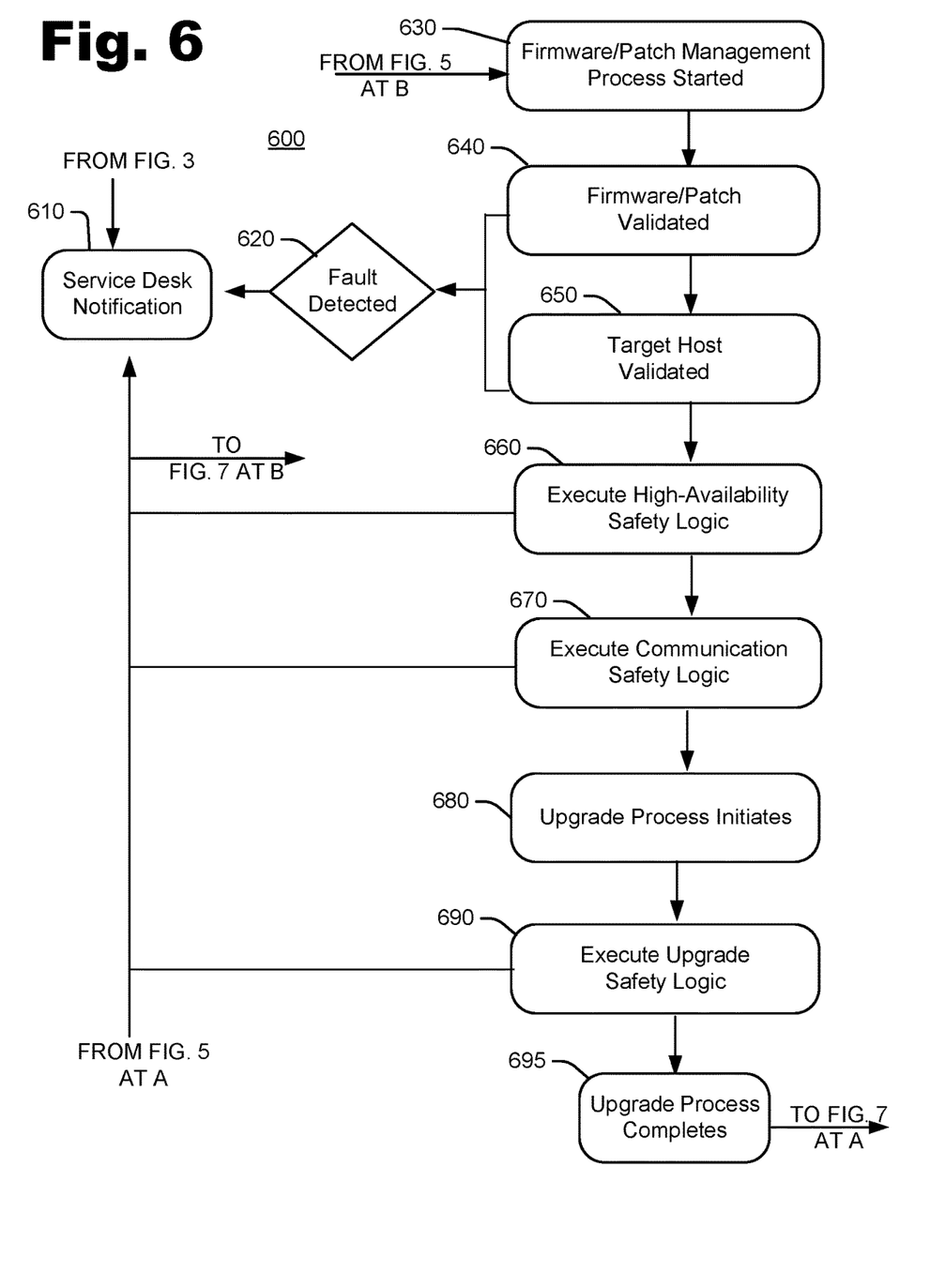

In FIG. 6, example operations 600 may enter from FIG. 3 and/or FIG. 5 (entering at A and B). Operation 610 includes a service desk notification, which may be executed when entering operations from FIG. 3, entering operations from FIG. 5 (entering at A), if a fault is detected in operation 620, or any of operations 660, 670, and 690.

A firmware/patch management process starts in operation 630. The firmware/patch is validated in operation 640. The target host is validated in operation 650. High-availability safety logic is executed in operation 660. Communication safety logic is executed in operation 670. the upgrade process initiates in operation 680. Upgrade safety logic executed in operation 690, and the upgrade process completes in operation 695. Operations may continue to operations shown in FIG. 7 (entering at A).

Figure 7:
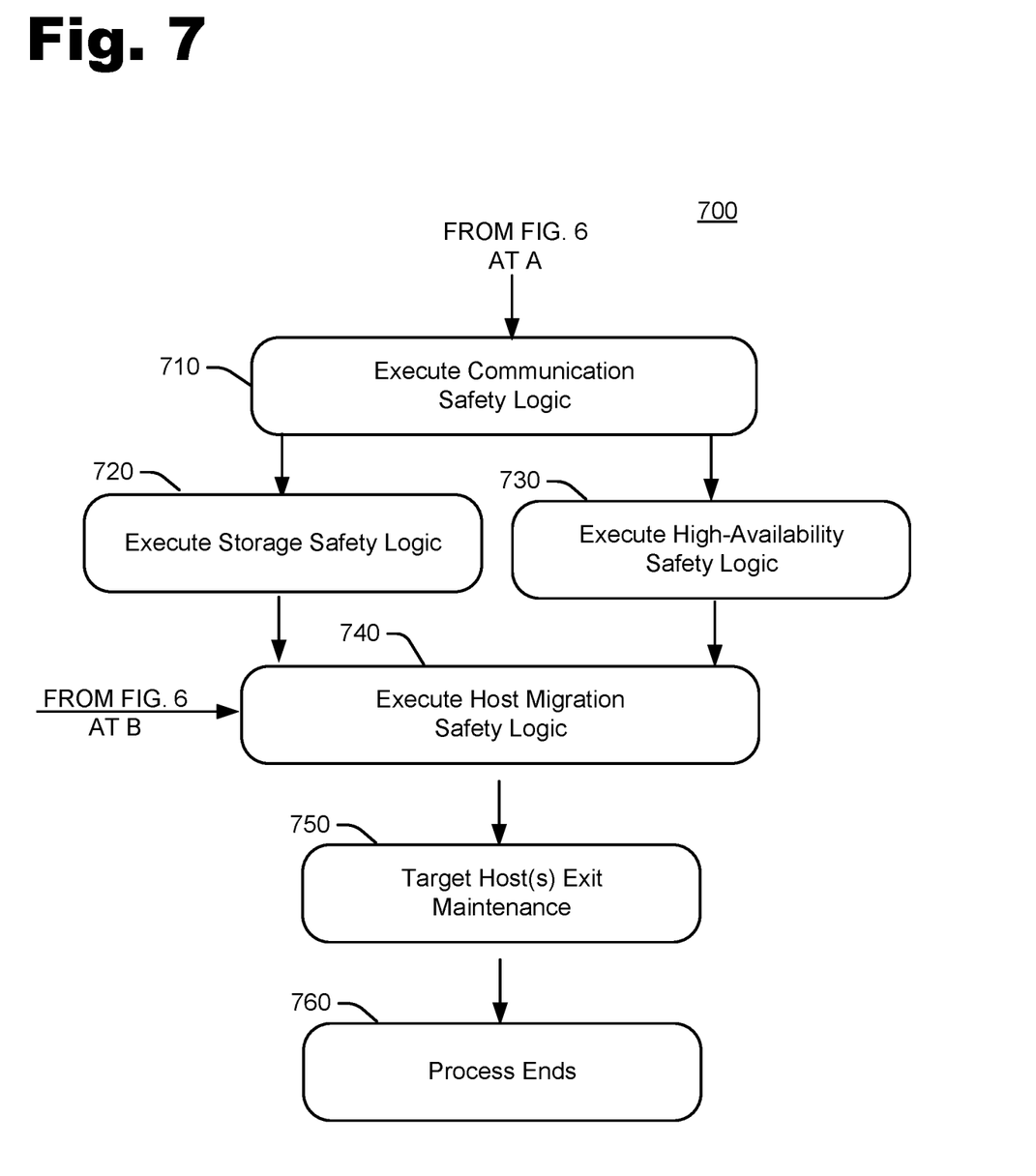

In FIG. 7, example operations 700 may enter from FIG. 6 (entering at A and/or B). In operation 710, communication safety logic is executed. In operation 720, storage safety logic is executed, and in operation 730 high-availability safety logic is executed. In operation 740, host migration safety logic is executed. In operation 750, the target host(s) exit maintenance. In operation 760 the process ends.

Figure 8:
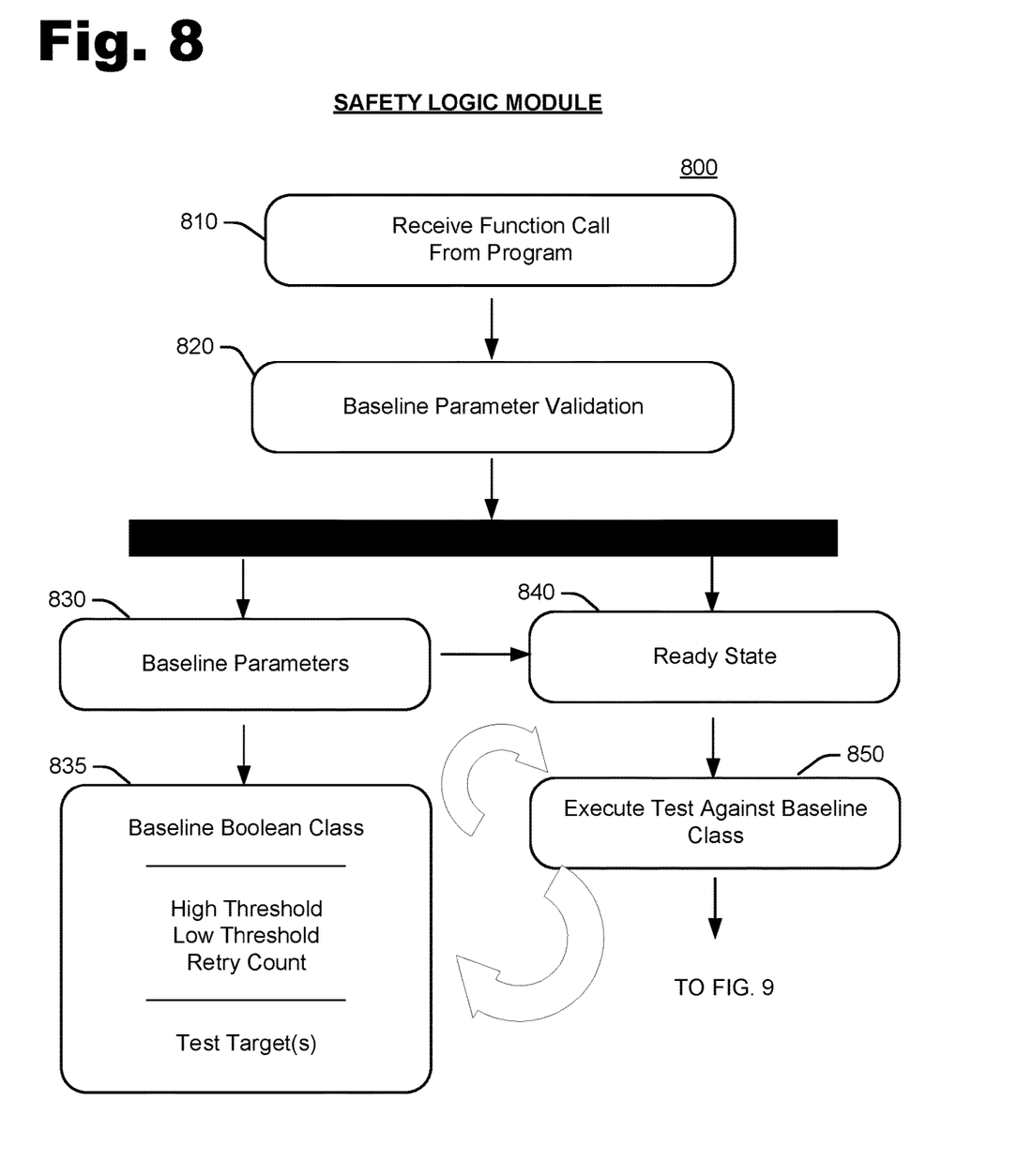
FIGS. 8-9 are process flow diagrams illustrating example operations of safety logic.
Figure 9:
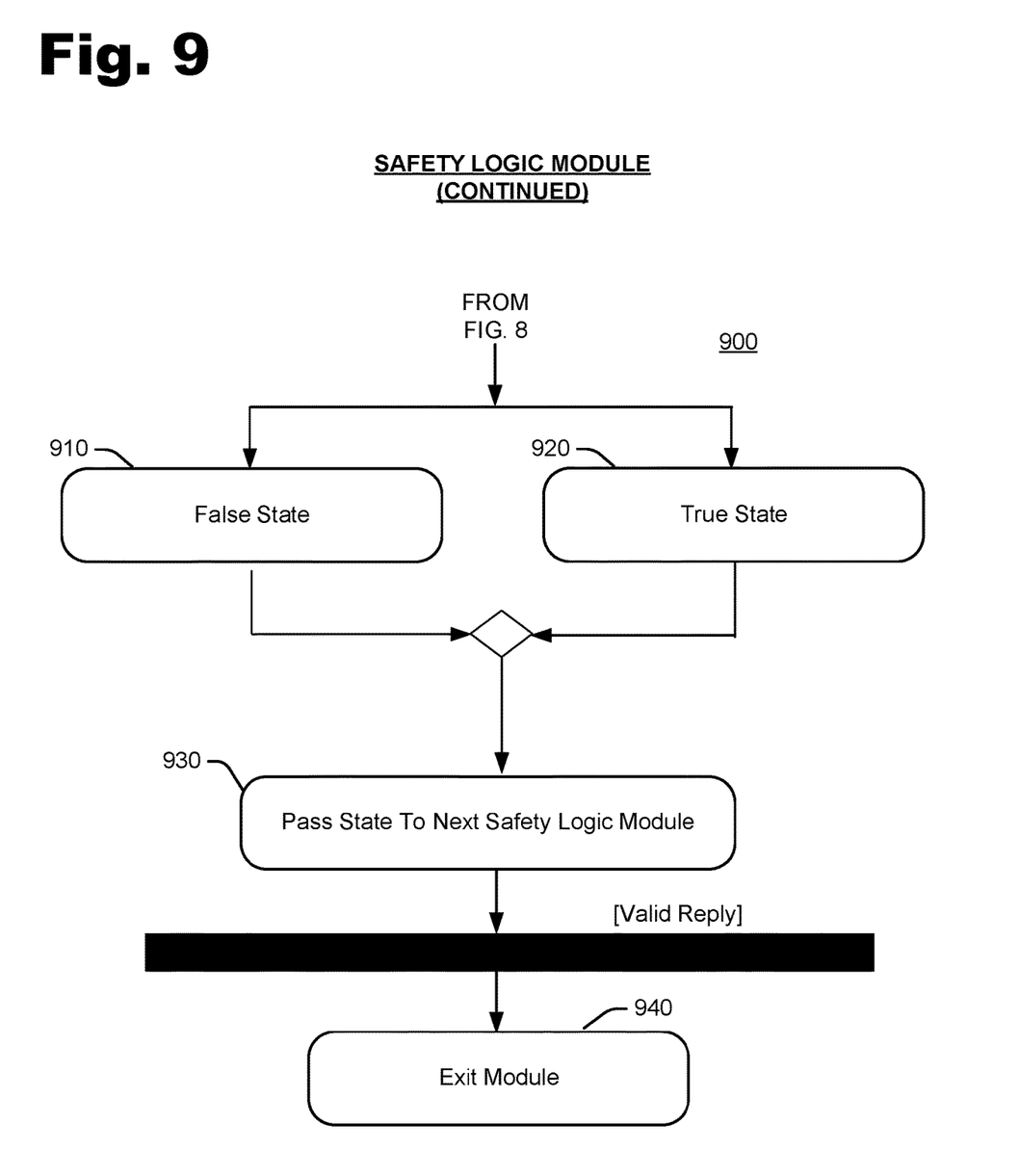

FIGS. 8-9 are process flow diagrams illustrating example operations 800 and 900 of safety logic. In FIG. 8, operation 810 includes receiving a function call from a program. In operation 820, base parameters are validated. Example base line parameters 830 may be a baseline boolean class 835, including a high threshold, a low threshold, and a retry count for various test target(s). Operation 840 checks for a ready state, and operation 850 executes a test against the baseline boolean class 835. Operations continue in FIG. 9.

In FIG. 9, operations determine whether conditions are in a false state 910 or a true state 920. The state is passed to the next safety logic module in operation 930. Given a valid reply, operations exit the safety logic module in operation 940.

It is noted that the examples shown and described are provided for purposes of illustration and are not intended to be limiting. Still other examples are also contemplated.

The invention claimed is:

1. An automation controller providing central management of an upgrade process in an IT infrastructure, comprising:
   one or more hardware processors configured by machine-readable instructions to:
      execute, by a control module, an automation code script and at least one corresponding automation input file;
      index, by an index module, data from the at least one automation input file to identify at least one target node in the IT infrastructure to be upgraded, and associate at least one patch firmware bundle with the at least one target node in the IT infrastructure;
      execute, by an execution module, the automation code script; and
      manage, by a management module, the upgrade process through to exception or successful completion of the upgrade process at the at least one target node in the IT infrastructure;
      wherein if the index module determines that the input file is missing data or the input file is improperly formatted, the execution module halts executing the automation code script and issues a notification to an administrator.

2. The automation controller of claim 1, further comprising a communications module configured to receive a location of the at least one patch firmware bundle from a hypervisor.

3. The automation controller of claim 1, further comprising a communications module configured to receive a location of the at least one patch firmware bundle from a patch management server.

4. The automation controller of claim 1, further comprising a communications module, wherein the automation code script includes instructions to perform a connectivity test on the at least one target node to ensure communication after the index module indexes the input file.

5. The automation controller of claim 4, wherein if the communications module cannot establish communication to the at least one target node, the execution module halts executing the automation code script and issues a notification to an administrator.

6. The automation controller of claim 1, wherein the index module performs target node inventory after confirmation of communication between the automation controller and the at least one target node.

7. The automation controller of claim 1, further comprising a validation module to perform validation against the at least one target node based on variables from the automation input file to ensure that the at least one target node meets minimum defined health parameters and has minimum defined resources available for a pending upgrade process.

8. The automation controller of claim 7, wherein after completing validation, the at least one target node is marked for maintenance within a configuration management database (CMDB), and the at least one target node is placed into a maintenance posture giving attention to any migration flags so that a hypervisor is available to execute specified updates from the automation input file.

9. The automation controller of claim 1, wherein the management module receives status messages during the upgrade process and subsequently recorded in an automation controller log file.

10. The automation controller of claim 1, wherein the management module halts the upgrade process if any errors are encountered during the upgrade process, and the management module issues an alert to an administrator specified in the automation input file.

11. The automation controller of claim 1, wherein the management module verifies patch and hardware revision levels and moves the at least one target node out of a maintenance posture by resetting migration flags upon successful completion of the upgrade process.

12. The automation controller of claim 11, wherein the management module updates a status of the at least one target node within a configuration management database (CMDB) and a final confirmation of the successful completion of the upgrade process is issued to the administrator.

13. The automation controller of claim 12, wherein the management module produces an option for the administrator to elect to retain the at least one target node in a maintenance posture after the successful completion of the upgrade process and continue by upgrading underlying hardware infrastructure before exiting the maintenance posture.

14. The automation controller of claim 13, wherein the management module is further configured to upgrade the underlying hardware infrastructure as a foundation layer for a virtual environment by communicating to a management server for the virtual environment.

15. The automation controller of claim 1, wherein the management module executes a REST API, and if any validations fail, the management module halts the upgrade process and issues an alert to an administrator specified in the automation input file.

16. The automation controller of claim 1, wherein the management module instructs a patch management server to push patch and firmware baselines to the at least one target node.

17. The automation controller of claim 1, wherein the management module receives status messages during the upgrade process, and the management module subsequently records the status messages in an automation controller log file.

18. The automation controller of claim 17, wherein if any errors are encountered, the management module halts the upgrade process and issues an alert to an administrator specified in the automation input file.

19. The automation controller of claim 1, wherein after successful completion of the upgrade process, the management module verifies patch and hardware revision levels at the at least one target node, moves the at least one target node out of a maintenance posture, resets migration flags where applicable, updates a configuration management database (CMDB), and issues a successful completion alert to an administrator.

20. An automation controller providing central management of an upgrade process in an IT infrastructure, comprising:
one or more hardware processors configured by machine-readable instructions to:
execute, by a control module, an automation code script and at least one corresponding automation input file;
index, by an index module, data from the at least one automation input file to identify at least one target node in the IT infrastructure to be upgraded, and associate at least one patch firmware bundle with the at least one target node in the IT infrastructure;
execute, by an execution module, the automation code script; and
manage, by a management module, the upgrade process through to exception or successful completion of the upgrade process at the at least one target node in the IT infrastructure;
perform validation, by a validation module, against the at least one target node based on variables from the automation input file to ensure that the at least one target node meets minimum defined health parameters and has minimum defined resources available for a pending upgrade process;
wherein after completing validation, the at least one target node is marked for maintenance within a configuration management database (CMDB), and the at least one target node is placed into a maintenance posture giving attention to any migration flags so that a hypervisor is available to execute specified updates from the automation input file.

21. An automation controller providing central management of an upgrade process in an IT infrastructure, comprising:
one or more hardware processors configured by machine-readable instructions to:
execute, by a control module, an automation code script and at least one corresponding automation input file;
index, by an index module, data from the at least one automation input file to identify at least one target node in the IT infrastructure to be upgraded, and associate at least one patch firmware bundle with the at least one target node in the IT infrastructure;
execute, by an execution module, the automation code script; and
manage, by a management module, the upgrade process through to exception or successful completion of the upgrade process at the at least one target node in the IT infrastructure;
wherein the management module halts the upgrade process if any errors are encountered during the upgrade process, and the management module issues an alert to an administrator specified in the automation input file.

22. An automation controller providing central management of an upgrade process in an IT infrastructure, comprising:
one or more hardware processors configured by machine-readable instructions to:
execute, by a control module, an automation code script and at least one corresponding automation input file;
index, by an index module, data from the at least one automation input file to identify at least one target node in the IT infrastructure to be upgraded, and associate at least one patch firmware bundle with the at least one target node in the IT infrastructure;
execute, by an execution module, the automation code script; and
manage, by a management module, the upgrade process through to exception or successful completion of the upgrade process at the at least one target node in the IT infrastructure;
wherein the management module verifies patch and hardware revision levels and moves the at least one target node out of a maintenance posture by resetting migration flags upon successful completion of the upgrade process.

23. An automation controller providing central management of an upgrade process in an IT infrastructure, comprising:
one or more hardware processors configured by machine-readable instructions to:
execute, by a control module, an automation code script and at least one corresponding automation input file;
index, by an index module, data from the at least one automation input file to identify at least one target node in the IT infrastructure to be upgraded, and associate at least one patch firmware bundle with the at least one target node in the IT infrastructure;
execute, by an execution module, the automation code script; and
manage, by a management module, the upgrade process through to exception or successful completion of the upgrade process at the at least one target node in the IT infrastructure;
wherein the management module executes a REST API, and if any validations fail, the management module halts the upgrade process and issues an alert to an administrator specified in the automation input file.

24. An automation controller providing central management of an upgrade process in an IT infrastructure, comprising:
one or more hardware processors configured by machine-readable instructions to:
execute, by a control module, an automation code script and at least one corresponding automation input file;
index, by an index module, data from the at least one automation input file to identify at least one target node in the IT infrastructure to be upgraded, and associate at least one patch firmware bundle with the at least one target node in the IT infrastructure;
execute, by an execution module, the automation code script; and
manage, by a management module, the upgrade process through to exception or successful completion of the upgrade process at the at least one target node in the IT infrastructure;
wherein the management module receives status messages during the upgrade process, and the management module subsequently records the status messages in an automation controller log file;
wherein if any errors are encountered, the management module halts the upgrade process and issues an alert to an administrator specified in the automation input file.

25. An automation controller providing central management of an upgrade process in an IT infrastructure, comprising:
one or more hardware processors configured by machine-readable instructions to:
execute, by a control module, an automation code script and at least one corresponding automation input file;
index, by an index module, data from the at least one automation input file to identify at least one target node in the IT infrastructure to be upgraded, and associate at least one patch firmware bundle with the at least one target node in the IT infrastructure;
execute, by an execution module, the automation code script; and
manage, by a management module, the upgrade process through to exception or successful completion of the upgrade process at the at least one target node in the IT infrastructure;
wherein after successful completion of the upgrade process, the management module verifies patch and hardware revision levels at the at least one target node, moves the at least one target node out of a maintenance posture, resets migration flags where applicable, updates a configuration management database (CMDB), and issues a successful completion alert to an administrator.

* * * * *